United States Patent [19]

Maurice

[11] Patent Number: 5,356,504
[45] Date of Patent: Oct. 18, 1994

[54] METHOD OF SEALING CRACKS IN FOUNDATION WALLS BY APPLYING POLYVINYL ACETAL AS A PRIMER FOR SILICONE SEALANT

[76] Inventor: Aurele E. Maurice, 138 Holten St., Danvers, Mass. 01923

[21] Appl. No.: 84,483

[22] Filed: Jul. 1, 1993

Related U.S. Application Data

[63] Continuation-in-part of Ser. No. 820,009, Jan. 13, 1992.
[51] Int. Cl.$^5$ ............................................. B05D 5/10
[52] U.S. Cl. ................................. 156/281; 156/315; 156/327; 427/387; 427/393.6; 427/407.2; 427/409; 427/419.7
[58] Field of Search ................... 427/387, 388.3, 393.6, 427/407.1, 407.2, 409, 419.7; 428/447, 524, 703; 156/327, 281, 315

[56] References Cited

U.S. PATENT DOCUMENTS

| | | | |
|---|---|---|---|
| 2,261,983 | 11/1941 | Ford | 175/356 |
| 2,366,049 | 12/1944 | Payne et al. | 156/327 |
| 2,403,077 | 7/1946 | Hershberger | 117/75 |
| 2,487,223 | 12/1949 | Cupery | 260/73 |
| 2,499,134 | 2/1950 | de Bruyne | 154/122 |
| 3,991,239 | 11/1976 | Anderson | 427/400 |
| 4,383,057 | 5/1983 | Yamamoto | 523/333 |
| 4,434,257 | 2/1984 | Narhawa | 524/5 |

FOREIGN PATENT DOCUMENTS 57-36166  2/1982  Japan .............................. 427/393.6

OTHER PUBLICATIONS

Vinyl Acetal Polymers, vol. 17, pp. 136–167, Encyclopedia of Polymer Science and Engineering, Second Edition, 1989.

*Primary Examiner*—Terry J. Owens
*Assistant Examiner*—Erma Cameron
*Attorney, Agent, or Firm*—Ellen C. Childress

[57] ABSTRACT

Polyvinyl acetal resins having an activating solvent, preferably ethanol are used to bond silicone rubber compounds securely to substrates. To repair crack masonry such as foundations, the masonry is first dried, then cleaned, and then the above described composition is applied. When tacky, the silicone caulk is placed in the crack. The seal will withstand more than 65 psi of water pressure without separating.

19 Claims, No Drawings

METHOD OF SEALING CRACKS IN FOUNDATION WALLS BY APPLYING POLYVINYL ACETAL AS A PRIMER FOR SILICONE SEALANT

This application is a continuation-in-part of U.S. patent application Ser. No. 07/820,009, filed Jan. 13, 1992.

FIELD OF INVENTION

This invention relates to vinyl polymer adhesives and their uses, including sealing cracked foundation walls.

BACKGROUND OF THE INVENTION

Cracked masonry, or concrete in foundation walls, swimming pools and other structures allows elements such as water and insects to pass from one side of the wall to the other. Placing silicone based caulks in such cracks is unsatisfactory, particularly in long vertical cracks, because such caulks do not bond sufficiently to concrete. The terms silicone rubber, silicone caulk and silicone sealant are used here interchangeably. Commercially available adhesives for silicone caulks have been found unsatisfactory, and many use noxious components, posing safety and environmental problems. One such adhesive is described in U.S. Pat. No. 3,455,762.

Terpolymers are polymers built from three component monomer units. By varying the ratios of monomer units, benefits from each type of unit can be utilized. Such polymers, because each molecule offers a choice of three different functional groups to bond with a surface, are likely to bond to a variety of surfaces. Vinyl acetal polymers are of particular interest. Acetals are formed by reacting alcohols with aldehydes. When the alcohol used is a polyvinyl alcohol, a polyvinyl acetal (or vinyl acetal polymer) is obtained.

Polyvinyl acetate is obtained by polymerization of vinyl acetate. Polyvinyl alcohol is obtained by reacting the polyvinyl acetate with methanol. Polyvinyl acetates are commonly used for adhesives.

U.S. Pat. No. 4,434,257 discloses a cement composition used as either a cement mortar for repair or a prime-coating cement mortar, using an ethylene-vinyl acetate copolymer.

Properties of polyvinyl acetal resins depend on the original ester selected, the extent of hydrolysis, the aldehyde employed and the extent of reaction between the alcoholic and aldehyde groups. Acetals are tougher, more resistant to water, but generally less resistant to weathering than corresponding acetates.

Of interest to the invention is polyvinyl butyral (CAS Registry Number 63148-65-2*), although other acetals might be effective. These resins are practically nontoxic by ingestion ($LD_{50}>10$ gm/kg), single dermal applications ($LD_{50}>7.94$ gm./kg), nonirritating to skins of rabbits and only slightly irritating to the eyes. Polyvinyl butyral is a widely used resin for the interlayer in safety glass, is not discolored by ultraviolet light and retains its toughness even at low temperatures. The replacement of acetate groups with bulky butyl groups changes the properties of the resin, resulting in a more hydrophobic polymer with a higher heat distortion temperature. At the same time, the polymer's toughness and adhesion to various substrates is considerably increased. Vinyl acetal films are characterized by high resistance to aliphatic hydrocarbons and most oils.

Polyvinyl butryal resins are generally soluble in alcohols, glycol ethers and certain mixtures of polar and non-polar solvents.

When an alcohol is the only solvent, viscosity of a solution tends to increase as the molecular weight of the alcohol increases. Previous literature suggests a blend of alcohols with aromatic solvents to develop a vinyl acetal solvent system. As a result, a higher ratio of resin solids to solvent can be obtained by using a low molecular weight alcohol. It has been noted that when alcohols are employed in a polyvinyl butryal solvent system, that the 99% grade should be used, since the presence of water gives lower solution viscosities. It has also noted that increasing the ratio of resin solids to solvent has little effect on the viscosity of the solution. Likewise, if the number of hydroxyl (—OH) groups in the polymer is insufficient, the polymer can be insoluble in certain alcohols, particularly methanol.

It has been noted that in some solvents, including ethanol and methyl ethyl ketone, polyvinyl butyral resins swell. Another phenomenon affected by solvent choice is "cobwebbing". Cobwebbing can be observed by dipping opposing fingers into resin solution and tapping the fingers together until the solution becomes tacky. In solutions where cobwebbing occurs, many thin strands of resin form.

While the principle use of polyvinyl butyral resins is in lamination of safety glass, others have been suggested. These include overcoating magnet wire (additional crosslinking used), surface coatings, wash primers (anticorrosive metal conditioners), improved metal coatings, wood finishes, knot sealers, printing inks, textile coatings, hot melt adhesives, modification of other resins, and structural adhesives.

Structural adhesives were originally developed for the aircraft industry to replace rivets. Refinements led to use in bonding brake linings, printed circuits, and architectural use for manufacture of interior and exterior curtain walls. These structural adhesives generally blend phenolic and acetal resins. Structural adhesives based on polyvinyl acetal resins can be applied as a solution, an unsupported film, a supported film on paper or cloth, or as a mixture of liquid and solid. If the adhesive is to be brushed on, solvents in the boiling range of 75°–100° C. are advised because they can be removed by air drying and then force dried for 0.5 to 1.0 ours at 105° C.

U.S. Pat. No. 2,261,983 discloses compositions containing polyvinyl acetals in combination with phenol-aldehyde resins for laminations to increase the electrical resistance between laminations of a bonded iron core. The solvent mixture suggested is one third ethyl alcohol.

U.S. Pat. No. 2,403,077, incorporated herein by reference, discloses a method of producing a metal laminated structure. The inventor, Hershberger, notes that "..., polymeric vinyl plastic materials such as polyvinyl acetal, polyvinyl acetate, and the like immediately suggest themselves. However, the polymeric vinyl compounds are not self-bonding to metal, and the lack of a suitable adhesive for bonding these plastic compounds to metal has constituted a serious obstacle to their wide use either as protective coatings or for fabricating plastic to metal structures." The "polyvinyl butryal" used in the resin contained a phenolic-formaldehyde component, in particular, a polyhydric-formaldehyde group.

U.S. Pat. No. 2,499,134, incorporated herein by reference, discloses a structural adhesive system using a phenolic adhesive sprinkled with a polyvinyl acetal. The sections to be joined were then brought together and heated at temperatures at temperatures above 200° F. (93.3° C.).

Silicon caulking, glazing and sealing compounds are made with a variety of characteristics, and for purposes of this application will be collectively referred to as silicone sealants. Properly bonded, silicone sealants are capable of up to ±50% joint movement. Because acetoxy cure silicone sealants emit fumes upon curing, and lack appropriate environmental resistance, they are not appropriate for use on interior cracks. RTV or room temperature vulcanizing sealants are available as odorless, neutral-cure sealants formulated to be non-corrosive to most building materials. However, when applied to large vertical cracks in cement, these peel off, therefore being unsatisfactory for this application.

The subject invention of this application fills a need for a low toxicity adhesive, capable of bonding a variety of materials, including silicone sealants, which can, in particular, be used to seal cracks, especially large vertical cracks, in foundations.

BRIEF SUMMARY OF THE INVENTION

This invention presents a composition and method for use of the composition. The composition has low toxicity and is useful as an adhesive or a primer. Although the adhesive works with a variety of materials, its ability to work with silicone sealants is of primary interest. The word adhesive, as used here, should be taken in broad context as causing to adhere as well as tending to adhere. When used as a primer, the composition is first allowed to become tacky and then silicone sealant applied. In this case, the primer causes the sealant to adhere. A method of using the composition to repair a foundation crack. The resultant repair is capable of withstanding expansion and contraction.

It is not the intention of the inventor to limit the invention to the particular embodiments presented. For example, it is possible that several polyvinyl acetal-solvent combinations exhibiting swelling and cobwebbing may promote adhesion of silicone sealants, or that minor changes in the ratio of resin to solvent could produce a range of viscosities.

DETAILED DESCRIPTION OF THE INVENTION

Composition 1

Powdered Butvar 76 brand polyvinl butyral resin was combined with methyl ethyl ketone in a volume ratio of resin to solvent of 1:4, blended at room temperature, and allowed to rest overnight.

Composition 2

Powdered Butvar 76 brand polyvinyl butyral resin was combined with methyl ethyl ketone in a volume ratio of resin to solvent of 5:16, blended at room temperature, and allowed to rest overnight.

Composition 3

Powdered Butvar 76 brand polyvinyl butyral resin was combined with 95% ethyl alcohol in a volume ratio of resin to solvent of 5:16, blended at room temperature, and allowed to rest overnight.

Composition 4

Powdered Butvar 76 brand polyvinyl butyral resin was combined with ethyl lactate and 95% ethyl alcohol in a ratio of 1:1:1 and allowed to rest overnight.

Composition 5

Powdered Butvar 76 brand polyvinyl butyral resin was combined with ethyl lactate in a ratio of 1:2 and allowed to rest overnight.

It is noted acetone and PMA were tried as solvents and found unsatisfactory. Both methyl ethyl ketone and ethyl alcohol exhibit swelling and cobwebbing. At first it was thought that the swelling was important to the bonding of porous concrete. However, compositions left for long periods, until the swelling was complete, showed no noticeable difference in behavior. The compositions have also been found to bond to metal and glass, leading away from the theory that swelling into a porous surface is the important mechanism.

EXAMPLE 1

Composition 1 was brushed onto two pieces of masonry. RTV 408 Industrial and Construction Silicone from C. R. Laurence was applied to one piece and the other piece contacted with the sealant to form a joint. The material was allowed to set for an hour. Although a strong bond is obtained as soon as the joint dries, bonding reaches maximum strength after several days. A bond is obtained which cannot be pulled apart by two adults.

EXAMPLE 2

Composition 2 was applied as in Example 1. Composition 2 had a higher viscosity for ease in applying to a vertical surface. The bonded surface was strong.

EXAMPLE 3

Composition 3 was applied as in Example 1. There was no objectionable odor, and the rate of dissolution was increased. After completion, the sealed joint was brushed with the primer to obtain a smooth surface. After drying, enamel paint was applied to the joint of example 3 and found to adhere satisfactorily. However, a latex paint which was applied was found to peel.

The primer has been found to be successful with a number of silicone caulks including MET silicone acrylic SS850, Dow Corning 7991, 795, and 99A, and GE ACE Silicone Sealant 3C.

Besides use as a primer, the polyvinyl-butyral composition may be mixed directly into the caulking and applied to the surface. Butyl Caulking 3C was mixed with the polyvinyl-butyral compositions in ratios of 2:1 and 4:1. Red Devil white polyurethane caulking was mixed with the polyvinyl-butyral composition in a ratio of 4:1. These mixtures were all found to adhere well to masonry.

EXAMPLE 4

A foundation having a large vertical crack was treated as follows. The surface was first dried by placing a heat lamp at the base of the crack. If the crack is dried with a fan, it is possible that the surface may dry, but not the interior. If too much heat is applied, the surface may be adversely affected. After, the surface was cleaned of all laitance, efflorescence, paint, whitewash and foreign substances in an area extending 3 in (about 7.5 cm.) on each side of the crack. Composition 3 was applied over the prepared surface with a brush working from the bottom of the crack upward, covering the total prepared surface. When the composition became tacky, silicone sealant was applied in the center of the crack up to ½" (about 1.25 cm.) thick on each side of the crack starting from the bottom. The material was then spread with a brush wetted with composition 3 using horizontal and diagonal strokes to achieve a smooth surface. When the surface dried prior to applying the caulk, more adhesive was applied. No peeling or drooping of sealant was observed.

EXAMPLE 5

Openings about 20 cm long, having a width ranging from 2 to 3 cm were saw cut into celled glazed partition blocks. Steel plates were placed on top and bottom of each block, then connected and held in place with bolts. A pressure gauge was placed in a aperture in the top plate and connected to water under pressure. Openings were primed respectively with Compositions 3, 4, and 5, and then sealed with an RTV silicone sealant (408). All formed strong bonds. A block sealed using composition 3 was baked in a cool oven (about 135° C.) for 12 hour. Water pressure was added to each block and measured. The results are shown as follows:

| Composition | Pressure of Separation | Notes |
| --- | --- | --- |
| 3 | >65 psi | Crack blown in block |
| 4 | 12 psi | |
| 5 | 15 | dries very slow |
| 3 (baked) | >60 | developed a pinhole |

In addition, the following compounds were tried as primers: epoxy shellac, polyurethane, VAL OIL primer, acrylic lacquer, and MINWAX. Except for the MINWAX primer, a bond was obtained, however, none of these bonds were waterproof.

The composition can also be used to glaze windows with silicone sealants The composition has also been successful in bonding cement to metal and silicone sealants to metal.

When the composition was stored at temperatures below 40° F. (4.5° C.), a jelly-like precipitate formed. When this precipitate was thinned with ethanol, the primer worked with no ill effects.

Because of low toxicity, ethanol is the solvent of choice. For paste or gel formulations, it is possible that addition of higher weight alcohols such as isopropanol may allow for thicker viscosity. Choice of sealant is dependent on toxicity and physical characteristics. The joint formed is waterproof and has good endurance. It would be possible to use the adhesive primer as waterproof coating by itself, preferably applied to the outside of a building. Since paint will not adhere to most silicone sealants, the compositions presented provide a primer for the surface of silicone sealants allowing them to be painted. Ethanol has low well know toxicity, is inexpensive and domestically produced.

Although the example given was a foundation crack, it is assumed the method could easily be adapted to sealing a swimming pool crack.

What is claimed is:

1. A method of bonding a concrete joint having at least a first and second element comprising the steps of:
   applying a polyvinyl acetal adhesive to said first and second elements;
   waiting until said adhesive becomes tacky;
   applying a silicone sealant over the adhesive; and
   contacting the elements with each other.

2. The method of claim 1 wherein said joint is a crack.

3. The method of claim 1 wherein said polyvinyl acetal adhesive comprises a polyvinyl butyral in admixture with ethanol.

4. The method of claim 1 further comprising the step of:
   pretreating the surface of said elements, wherein said pretreatment comprises the steps of:
   drying said surfaces: and
   cleaning said surfaces.

5. A method of imparting a paintable surface to a silicone sealant surface comprising the steps of:
   applying a polyvinyl butyral adhesive to said sealant surface; and
   drying said adhesive.

6. A method for bonding a silicone sealant to a substrate comprising the steps of:
   providing a mixture comprised of a polyvinyl acetal and an activating solvent chosen from the group consisting of alcohols and ketones;
   coating said substrate with said mixture; and
   contacting said sealant with said coated substrate.

7. The method of claim 6 wherein said providing step comprises:
   providing a mixture comprised of a polyvinyl butyral and an activating solvent.

8. The method of claim 7 wherein said providing step comprises:
   providing a mixture comprised of a polyvinyl butyral and ethanol.

9. The method of claim 8 wherein the substrate is chosen from the group consisting of concrete, masonry, glass, wood, enamel paint and metal.

10. The method of claim 3 wherein said steps are carried out at a temperature less than 100°C.

11. The method of claim 3 wherein said steps are carried out at ambient temperature.

12. The method of claim 10 further comprising:
    pretreating the surface of said elements, wherein said pretreatment comprises the steps of:
    drying the surface of at least one of said elements; and
    cleaning said surface.

13. The method of claim 12 wherein said cleaning step comprises removing efflorescence from said surface.

14. The method of claim 9 wherein further comprising the steps of:
    coating said mixture on an exposed surface of said sealant; and
    painting said exposed surface.

15. The method of claim 9 further comprising:
    pretreating the surface of said substrate, wherein said pretreatment comprises the steps of:
    drying said surface, and
    cleaning said surface.

16. The method of claim 15 wherein said cleaning step comprises:
    removing efflorescence from said surface.

17. The method of claim 6 wherein said providing step comprises:
    providing a mixture comprised of polyvinyl butyral, ethanol and an ester.

18. The method of claim 16 wherein said providing step comprises:
    providing a mixture comprised of polyvinyl butyral, ethanol and ethyl lactate.

19. The method of claim 13 further comprising the step of:
    allowing said coated surface to become tacky.

* * * * *